Nov. 17, 1970  H. R. BRUET  3,540,330
HYDRAULIC DUPLICATOR WITH FEELER
Filed Sept. 10, 1968  6 Sheets-Sheet 3

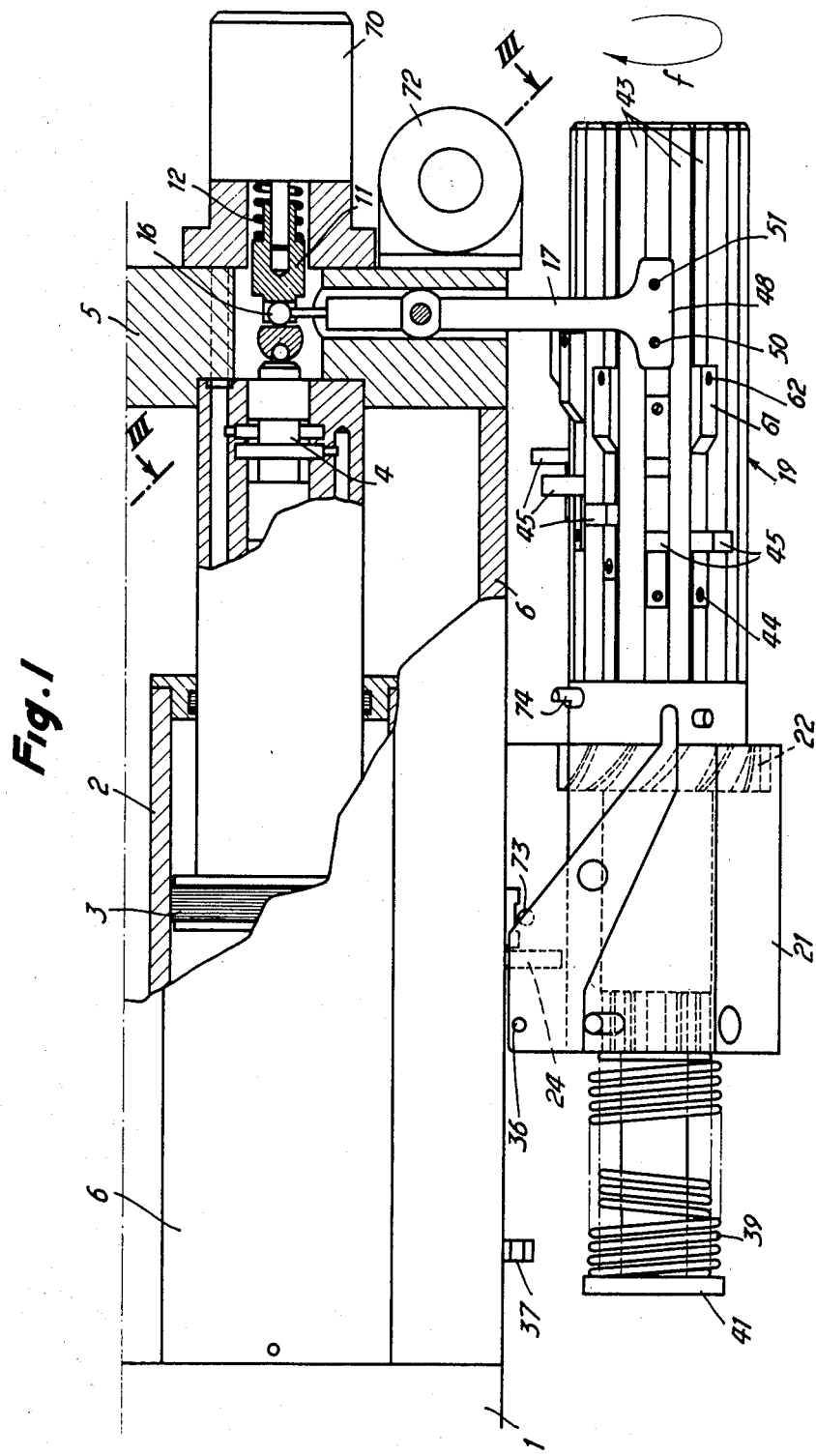

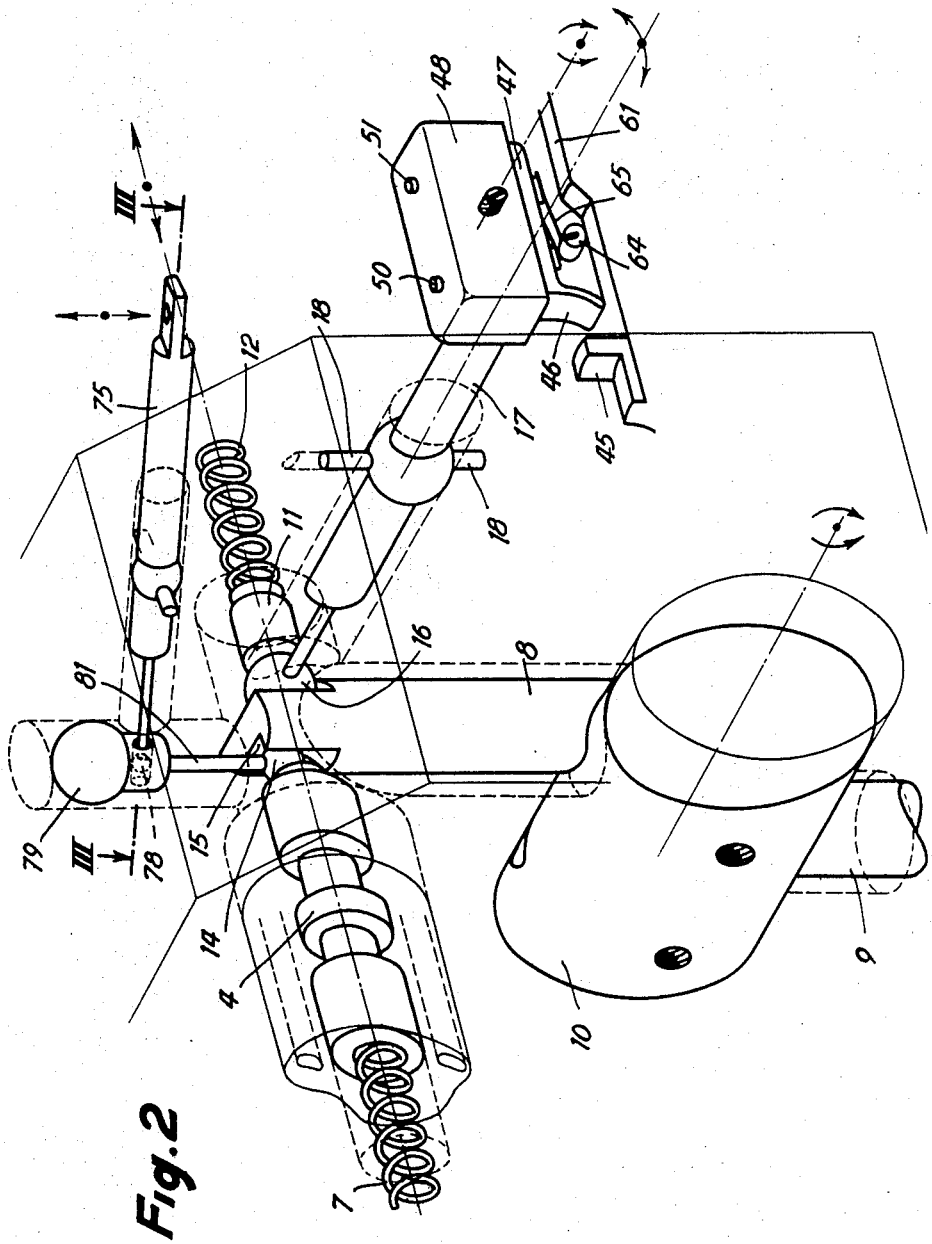

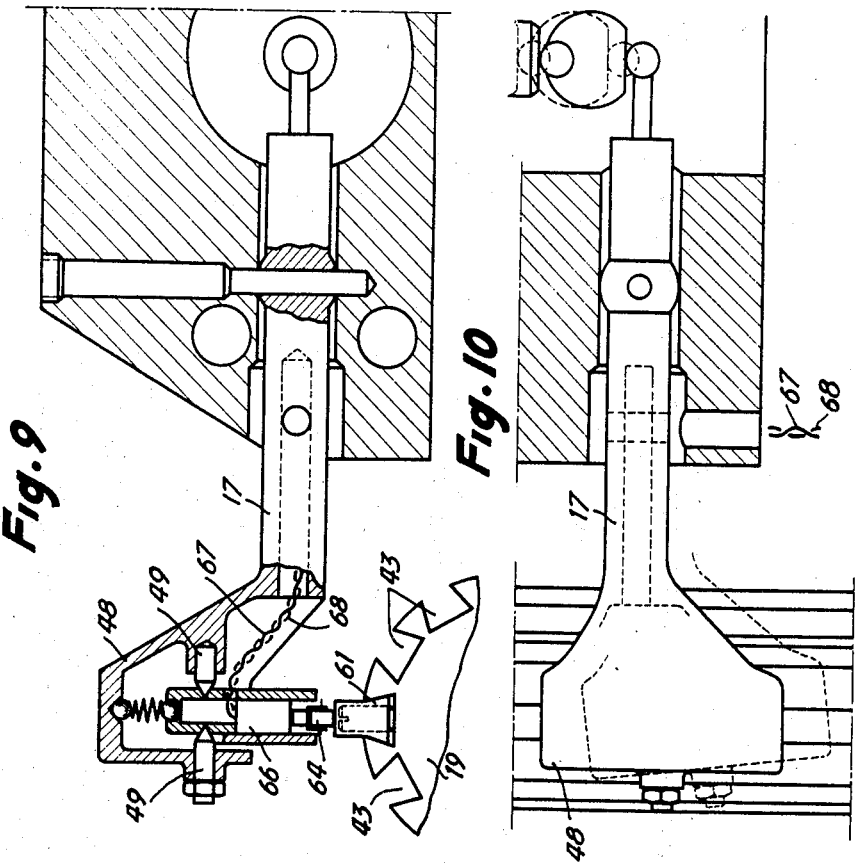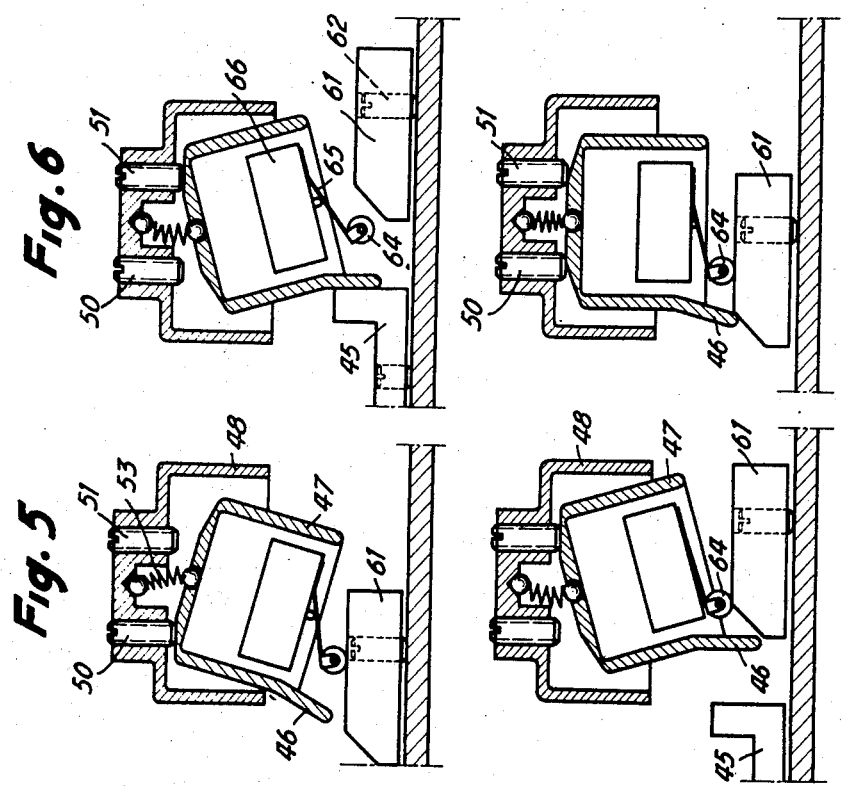

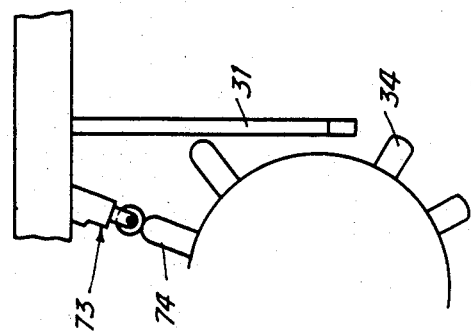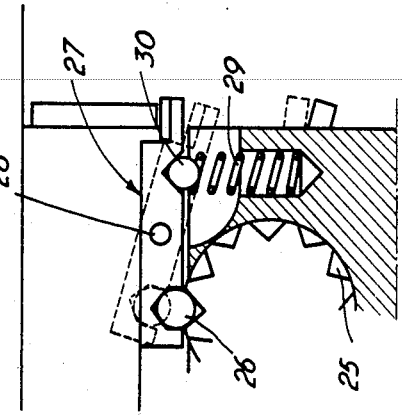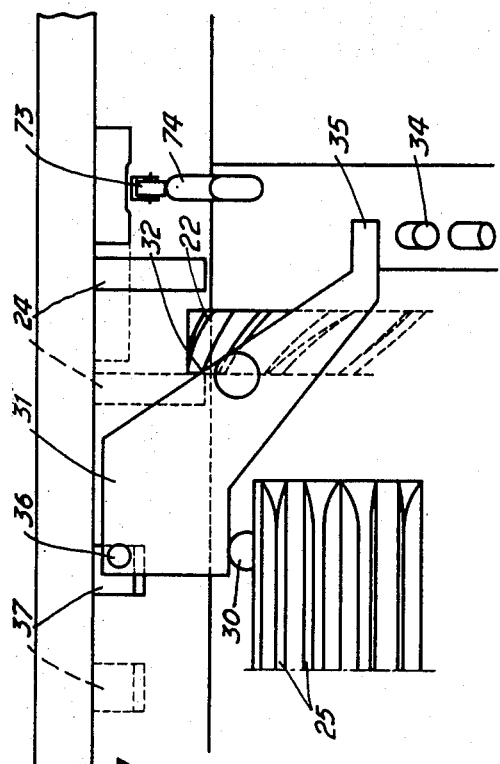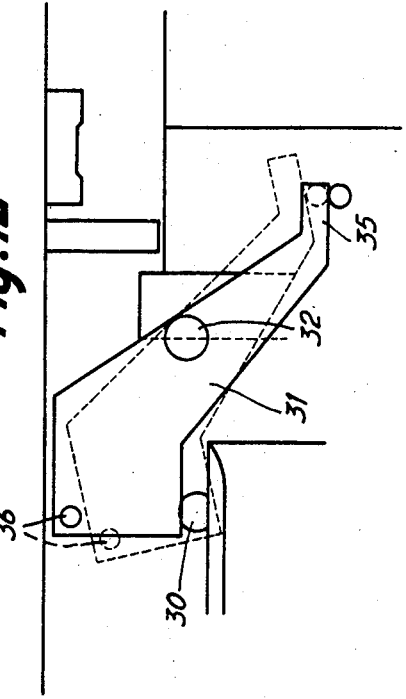

United States Patent Office 3,540,330
Patented Nov. 17, 1970

3,540,330
HYDRAULIC DUPLICATOR WITH FEELER
Henri René Bruet, Paris, France, assignor of one-half to Etablissements A. Cazeneuve, la Plaine-Saint-Denis, Seine-Saint-Denis, France, a French company
Filed Sept. 10, 1968, Ser. No. 758,774
Claims priority, application France, Sept. 15, 1967, 121,149
Int. Cl. B23b *3/28*
U.S. Cl. 82—14
18 Claims

ABSTRACT OF THE DISCLOSURE

Hydraulic duplicating mechanism for use in machine-tools and in particular in slide lathes for the purpose of displacing the tool transversely to the direction of its displacement along the workpiece as a result of the action produced on the hydraulic distributor of the duplicating mechanism by a feeler which forms part of the said duplicating mechanism and which is adapted to cooperate with a template or part to be duplicated, the duplicating mechanism comprising for determining the position of equilibrium of the distributor under the action of the feeler a retaining device which is independent of the template or of the part to be duplicated and which is placed so as to serve as a stop for the feeler, said retaining device being secured to the fixed unit of the duplicator and stationarily mounted in relation thereto while comprising a retaining member which is positionally variable with respect to the said fixed unit and which can thus be brought on the path of the feeler under the action of a mechanism for changing the position of the said retaining member and into successive positions located in spaced relation along the path of a member which is positionally related to the feeler, the successive positions aforesaid being preferably variable along said path.

---

The present invention relates to the hydraulic duplicating mechanisms which are employed in machine-tools, in particular in slide lathes for the purpose of displacing the tool transversely to the direction of its displacement along the workpiece as a result of the action produced on the hydraulic distributor of the duplicating mechanism by a feeler which forms part of said duplicating mechanism and which is adapted to cooperate with a template or part to be duplicated.

The main objective of the invention is to permit the possibility, by making use of the duplicator and without any displacement of the cross-slide of the machine-tool, to produce a number of successive cuts of predetermined and preferably equal depth without any contact between the feeler and the template, thereby dispensing with the need of successive templates defining the succession of machining cuts to be performed.

A second objective of the invention which is complementary to the preceding but additionally provides an inherent advantage which is independent of the first objective lies in the fact that the performance of a number of successive cuts of predetermined depth can be initiated automatically.

The invention is consequently directed to a hydraulic duplicator of modified design and endowed with means for achieving at least one and preferably both of the objectives aforesaid.

In accordance with the invention, in order to determine the position of equilibrium of the distributor under the action of the feeler, the duplicating mechanism comprises a retaining device which is independent of the template or of the part to be duplicated and which is placed so as to serve as a stop for the feeler, said retaining device being secured to the fixed unit of the duplicator and stationarily mounted in relation thereto while comprising a retaining member which is positionally variable with respect to said fixed unit and which can thus be brought on the path of the feeler under the action of a mechanism for changing the position of said retaining member and into successive positions located in spaced relation along said path or alternatively along the path of a member which is positionally related to the feeler, the successive positions aforesaid being preferably variable along said path.

As a preferred feature and in order to achieve the second objective aforesaid, the mechanism for changing the position of the retaining member is interposed between this latter and the sliding unit of the duplicator, thereby automatically changing the position of said retaining member as a function of the sliding motion of said sliding unit of the duplicator and in principle at the end of the movement of withdrawal of said sliding unit.

In an advantageous embodiment, said retaining member is a rotary drum, guides being formed at the periphery of said drum and parallel to the axis thereto, said axis being parallel to the direction of sliding motion of the moving unit of the duplicator.

A third objective of the invention which is preferably adopted in conjunction with the preceding consists in ensuring that, prior to execution of the following cut, that the full cross-traverse reverse motion of the tool at an intermediate point which can be variable according to the cut and located along the length of one template is carried out automatically.

To this end, in addition to the control of the duplicator distributor by the feeler itself, the duplicator comprises an auxiliary device for displacing the distributor in the direction which produces the withdrawal of the sliding unit of the duplicator and therefore the cross-traverse reverse motion of the tool. Said auxiliary device comprises a control member carried by the sliding unit of the duplicator and adapted to accompany said unit in its motion but capable of changing position with respect to the sliding unit under the action of a retaining device which is secured to the fixed unit of the duplicator and stationarily mounted in relation thereto while comprising a retaining member which is positionally variable with respect to said fixed unit so as to permit of its being brought selectively on the path of said control member under the action of a mechanism for changing the position of said retaining member and into positions which are spaced along said path and preferably variable separately along said path, said position-changing mechanism being interposed between said retaining member and the sliding unit of the duplicator, thereby automatically changing the position of said retaining member as a function of the motion of said sliding unit of the duplicator and in principle on completion of the movement of withdrawal of said unit. The change of position of said control member when this latter comes up against the retaining device is utilized for the purpose of displacing the distributor, for example by initiating the closure of a contact inserted in the energizing circuit of an electromagnet for producing the displacement of said distributor. Re-opening of said contact is carried out by means of a pivotal lug which takes part in the displacement of the sliding unit and is adapted to produce action on the switch as a result of its pivotal motion as and when said lug subsequently comes into contact with the retaining device.

By means of this device, the effective travel of the feeler along the template or part to be reproduced can ge regulated at will, the feeler travel being measured from the point at which the feeler comes into contact with the template or with said part to be reproduced.

Whereas the first retaining device aforesaid which defines the depths of machining cuts without making use of any contact between the feeler and the template or part to be duplicated already makes it possible to dispense with the usual systems for controlling the cross-traverse positioning of the tool, the second retaining device in turn dispenses with the usual systems for controlling the longitudinal-traverse positioning of the tool.

Further properties and advantages of the devices according to the invention will appear from the following description of a particular embodiment which is given solely by way of example in an application to a slide lathe and which is illustrated diagrammatically in the accompanying drawings, wherein:

FIG. 1 is a plan view with portions broken away showing the two devices in accordance with the invention, said devices being combined into a single assembly which comprises a number of common elements;

FIG. 2 is a vertical view in perspective showing a number of moving elements of said assembly;

FIGS. 5 to 10 show different stages of operation of the two retaining devices and the elements which are actuated by said devices;

FIG. 11 is a plan view of the device for positioning the rotary drum and controlling the quick-reverse motion;

Figure 14:
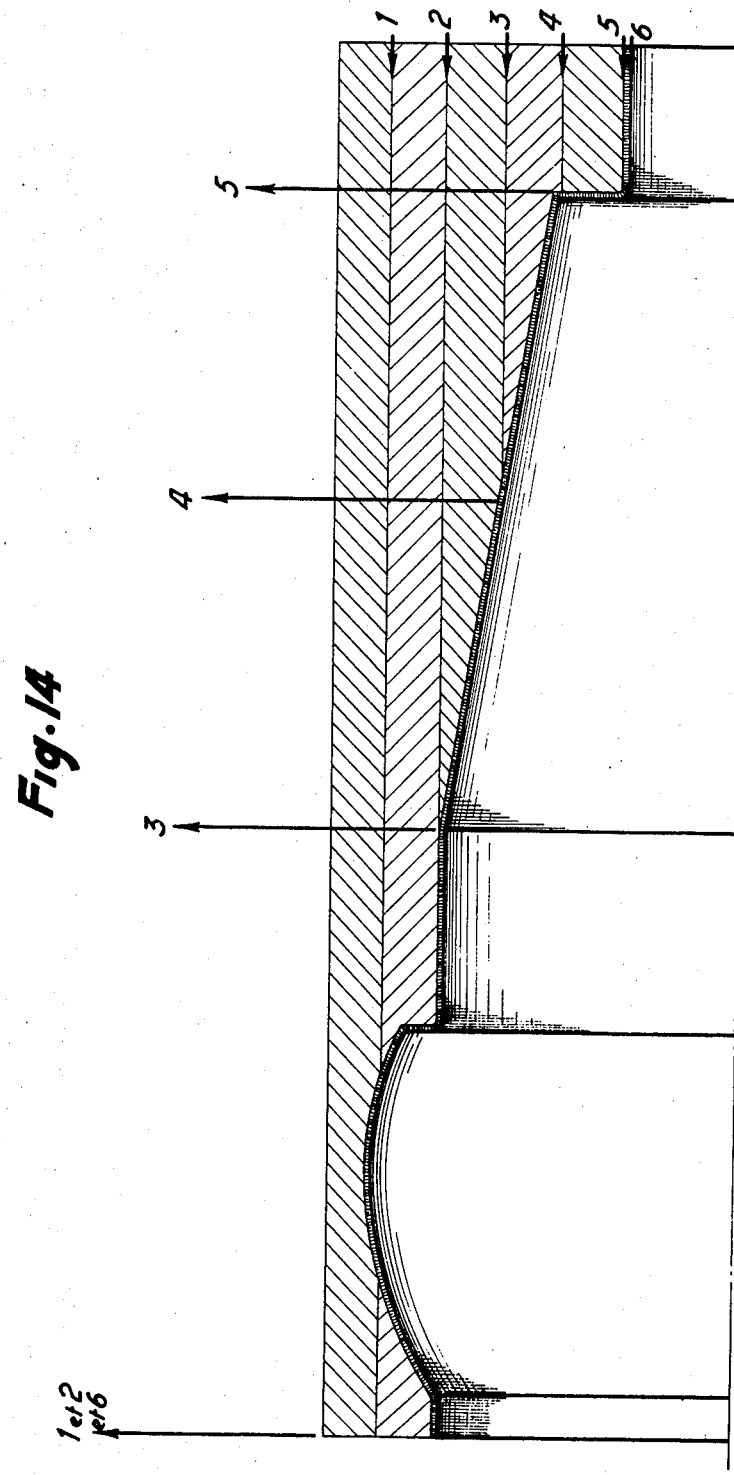

FIG. 12 which is similar to FIG. 11 shows the positioning device during operation;

FIG. 13 is a sectional view of the positioning device, this view being taken at right angles to the axis of rotation of the drum;

FIG. 14 shows by way of example a workpiece to be machined on a slide lathe or engine lathe by means of the devices according to the invention and the method proposed for performing the machining operation on said workpiece.

In the exemplified embodiment which will now be described, the duplicator is of the type described in French Pat. No. 1,098,467. Only those components of the device which are essential to a proper understanding of the invention have been illustrated in the drawings. As shown in FIG. 1, said duplicator essentially comprises a fixed unit 1 which is intended to be carried by the cross-slide of a lathe and which comprises a cylinder 2 containing a differential piston 3. A liquid under pressure can be selectively admitted on each side of said piston by means of a distributor which is incorporated in said piston and which comprises a slide-valve 4. The end of the piston 3 which passes out of the cylinder 2 is secured to an end-wall 5 and this latter is rigidly fixed to the outer shell 6 which is adapted to slide over the fixed unit 1 and constitutes the sliding unit of the duplicator. There is fitted within a blind-end bore of the piston 3 a spring 7 which is applied endwise against one end of the slide-valve 4 (as shown in FIG. 2) and urges this latter towards the right-hand side, thereby applying the other end of said slide-valve against the tailpiece 8 of a feeler 9. Said tailpiece 8 and feeler 9 are secured to a cylindrical body 10 which is rotatably mounted in the end-wall 5 about an axis which is perpendicular to that of the cylinder 2. There are mounted coaxially with the spring 7 but at the end remote from the tailpiece 8 a sliding nut 11 and a spring 12 which is intended to apply a thrust on the nut 11 and on the tailpiece 8 through the intermediary of said nut, the direction of said thrust being opposite to that of the spring 7. There is also placed between the tailpiece 8 of the feeler and the slide-valve 4 a ball 14 which is in contact with a shoulder 15 formed in such a manner as to slope downwards from the end of said tailpiece. The design function and mode of displacement of said ball along the shoulder 15 will be described hereinafter.

In accordance with the invention, a ball 16 is placed between the tailpiece 8 of the feeler and the nut 11 and is attached to the end of a horizontal arm 17 which is located at right angles to the axis of the piston 3. Said arm is housed within a bore of the end-wall 5, is adapted to project externally of said bore and is pivotally mounted therein by means of small pins 18 with which the arm is provided so as to permit of its pivotal motion about an axis which is parallel to that of the feeler.

There extends on each side of said arm 17 and beneath this latter a rotary cylindrical body or drum 19 having an axis which is parallel to that of the piston 3 and one line of extension of which passes through a casing 21 in which the drum is carried in such a manner as to be capable of rotation about its own axis, said casing being secured to the fixed unit 1 of the duplicator. An annular wheel 22 is in turn secured to the casing and provided at its periphery with helical extension grooves. A stud 24 is fixed on the sliding unit 6 of the duplicator and is thus intended to move with said unit. The end of one of said grooves is located on the path of said stud, the rotary drum being maintained for this purpose by means of a positioning device. Said device comprises an annular arrangement of V-shaped grooves 25 (as shown in FIG. 13) which are formed at the periphery of the rotary drum extension and in which a roller 26 is intended to rest. Said roller is carried by an arm 27 which is located transversely to the rotary drum and pivotally mounted at 28 on the casing 21 so as to perform pivotal movement about an axis which is parallel to the rotary drum under the action of the thrust applied by a spring 29 which is housed within a bore formed in said casing, a ball 30 being placed on the upper extremity of said spring and engaged within a recess of the arm 27. In addition, said arm is in contact with a rocker-arm 31 which is mounted on the casing at 32 for pivotal motion about a vertical axis, the function of said rocker-arm being to cause said arm 27 to pivot in opposition to the spring 29 and thus to move the roller 26 out of the positioning grooves 25. The pivotal movement referred-to is caused by the rotational movement of the drum which takes place when a stud 34 which is fixed on the drum so as to project radially therefrom comes into contact with an appendage 35, said appendage being formed on the end of the rocker-arm 31 and adapted to extend along the circular path of said stud 34. The rocker-arm 31 additionally carries a lug 36, the position of which is such that, when the roller 26 is placed within the recesses 25, said lug 36 is located on the path of a lock-catch 37 which is secured to the sliding unit 6 of the duplicator and the opening of which is directed towards said unit. The position of said lock-catch on the sliding unit 6 is such that, when the sliding unit is located in the position of maximum withdrawal, the lug 36 engages freely in said catch (position shown in full lines in FIG. 11). On the other hand, when the roller 28 is located outside the recesses 25 under the action of the stud 34 on the rocker-arm 31, the lug 36 is applied against the rear of said lock-catch (position shown in dashed lines in FIG. 12), thereby preventing the roller 36 from falling back into a recess 25 as long as the sliding unit of the duplicator has not moved back in the forward direction (that is to say towards the left-hand side of the figure).

The movement of rotation of the drum 19 is carried out as a result of the engagement of the stud 24 in one of the helical grooves which is maintained on its path by the positioning device aforesaid at the time of withdrawal of the sliding unit 6 of the duplicator, that is to say towards the right-hand side of FIG. 1; the grooves are inclined in such a manner that the travel of the stud 24 causes the rotational movement of the drum in the direction indicated by the arrow $f$ in FIG.1. The length of the grooves is such that the drum rotates to an extent which corresponds to the distance between two adjacent grooves 25. The roller 26 is lifted in opposition to the action of the spring 29 by the side of the recess 25 in which it had been resting and drops back into the following recess. But the stud 24 has a thickness which is smaller than the width of each of said helical grooves and these latter are maintained by the positioning device in a position such that the center of the groove entrance in which the stud 24 engages at the time of the movement of withdrawal of the sliding unit 6 is located to the rear of the axis of said stud in the direction $f$ of rotation of the drum. In consequence, as and when the sliding unit 6 moves forward and the stud 24 penetrates into one of the grooves, said stud comes into contact with the side of the groove only after having passed into the groove over a certain distance. The stud therefore causes the movement of rotation of the drum in the direction opposite to $f$ to a smaller extent and the side of the groove 25 cannot lift the roller 26 sufficiently to displace this latter into the adjacent groove. The rotary drum thus remains in the position in which it has been moved as a result of the transfer of the stud 24 at the time of the previous movement of withdrawal of the sliding unit 6. It is therefore apparent that the drum 19 rotates only at the time of the movement of withdrawal of the sliding unit 6. In addition, the positions of the stud 24 and of the wheel 22 with helical grooves are chosen so that the stud 24 comes into contact with the wheel 22 only at the end of the movement of withdrawal of the sliding unit 6 so that the stud 24 has just passed over the wheel 22 when the movement of withdrawal of the sliding unit 6 comes to a stop. In the direction opposite to that of the arrow $f$, the rotary drum is acted upon by a combination of two springs 39, 40 which are disposed in coaxial relation both with each other and with the rotary drum at the end of the extension of this latter and which work by twisting in opposition to each other. The spring 39 is secured at one end to a freely-rotatable disc 41 and at the other end to the casing 21 whilst one end of the spring 40 is secured to said disc 41 and the other end thereof is attached to a washer (not shown in the drawings) which is rigidly fixed to the rotary drum. Said drum is thus subjected to a constant restoring torque.

That portion of the rotary drum 19 above which the arm 17 is adapted to move during the sliding motion of the sliding unit 6 relative to the fixed unit 1 is provided with longitudinal guides which consist of grooves 43 in the example which is illustrated, the number of said guides being equal to the number of grooves 25. A bracket 45 can be fixed in each groove 43 in any desired position by means of a screw 44 and constitutes a stop for the arm 17 when it is brought on the path of said arm as a result of the rotation of the drum 19. The arm 17 is applied in abutting contact with said stop bracket by means of a lug or appendage 46 forming part of a bell-housing 47 (as shown in FIGS. 5 to 10) which is disposed within a cage 48. Said cage 48 is rigidly fixed to the extremity of the arm 17 and mounted within said bell-housing to perform a pivotal movement about an axis at right angles to that of the rotary drum by means of two opposite pivot-pins 49 (shown in FIG. 9) which are fitted in the interior of the cage 48. The bell-housing 47 is capable of rocking inside the cage between two end positions (as shown in FIGS. 5 and 6) determined by adjustable stops 50, 51 constituted by screws which are passed through the base of the cage 48. A spring 53 is interposed between said base and the base of the bell-housing 47 and is placed between the two stops 50 and 51 in such a manner as to ensure that the point of application of said spring against the bell-housing moves from one side of the pivotal axis to the other when said bell-housing performs a pivotal movement through a given angle. The position of abutment of the arm 17 against a stop bracket 45 through the intermediary of the bell-housing 47, bell-housing appendage 46 and cage 48 is shown in FIG. 6.

From the foregoing, it is apparent that the complete assembly consisting of the rotary drum and its positioning mechanism constitutes for the arm 17 and therefore for the feeler a retaining device wherein the rotary drum and adjustable brackets in combination form the position-changing retaining member. As is already known per se, the assembly which consists of slide-valve 4, feeler 8, 9 and spring 12 is so adjusted that, when no external force is applied on the feeler, the slide-valve 4 is in equilibrium in a position in which it allows the liquid under pressure to penetrate on the appropriate side of the piston 3 (right-hand side in FIG. 1) in order to displace said piston together with the sliding unit 6 of the duplicator towards the left-hand side of the figure, that is to say in the direction which brings the tool towards the part to be machined and the arm 17 towards the stop brackets 45. When said arm 17 encounters the particular stop bracket 45 which is located on its path, said arm oscillates to a slight extent, displaces the slide-valve 4 towards the left and thus cuts off the supply of liquid behind the piston, thereby arresting this latter, with the result that the sliding unit 6 of the duplicator is in a position of equilibrium; this position is thus determined by the position of the bracket 45 along the rotary drum 19. When, as a result of the rotation of the drum 19, another stop bracket 44 which has a different position along the rotary drum is substituted for the preceding bracket, the arm 17 which is no longer in abutting contact with this latter swings slightly towards the left so as to return to its initial position in which liquid under pressure is admitted behind the piston 3 and the previous process is repeated; the sliding unit 6 of the duplicator moves towards the left until the arm 17 again encounters the new bracket 45, thereby determining a new position of equilibrium of the sliding unit 6. The tool is thus advanced further towards the workpiece and the feeler is advanced towards the template or part to be duplicated over a distance corresponding to the distance between said two brackets 45. Assuming that the tool was previously located in contact with the part to be machined, this displacement constitutes the depth of cut to be machined by the tool. The brackets 45 therefore constitute stops which govern the depth of cut. It is to be noted that the positions of equilibrium of the sliding unit 6 of the duplicator are no longer determined as is usually the case by bringing the feeler into abutting contact with a template but by applying the arm 17 in abutting contact with one of the stop brackets 45.

Moreover, each groove 43 of the rotary drum 19 can additionally be provided on the side of the lug 46 which is remote from the stop brackets 45 with a stop block 61 which is positionally adjustable within its groove by means of a screw 62. Each stop block 61 which is located in the same groove as a stop bracket 45 is thus brought at the same time as this latter on the path of the lug 46 when the sliding unit 6 of the duplicator moves over the fixed unit. However, in contradistinction to the stop brackets 45 which are encountered by the lug 46 when the sliding unit 6 advances, the stop blocks 61 encounter the lug 46 at the time of withdrawal of said sliding unit. In order that contact should be made with the sloping end of the stop block 61 before the lug 46 at the time of withdrawal of the sliding unit, provision is made between the lug 46 and the stop block 61 (as shown in FIG. 7) for a roller 64 carried at the end of a rocker-arm 65 which controls a microswitch 66 with push-button housed within the bell-housing 48. Said micro-switch is inserted in two circuits 67 and 68 (as shown in FIG. 10) which terminate respectively in the usual electric device for producing the quick return motion of the slide-rest of the lathe and in a relay comprising a circuit for maintaining closed the energizing circuit of an electromagnet 70 which is secured to the end-wall 5 in the axis of the nut 11 and which, in the energized state, is capable of displacing said nut by means of its movable armature and within the slide-valve 4 in opposition to the spring 7. This displacement of the slide-valve 4 towards the left has the effect of directing the liquid under pressure to the opposite side of the piston 3 and thus of producing a rapid movement of withdrawal of the sliding unit 6 of the duplicator. This fast withdrawal causes the roller 64 to run onto the stop block 61 (as shown in FIG. 7), then brings the lug 46 into contact with the sloping end of the stop block 61 (as shown in FIG. 8) under whose influence the bell-housing pivots to its mean position, thereby opening the micro-switch 66 whilst the electromagnet 70 nevertheless remains energized. Then, under the action of the spring 53, the bell-housing completes its pivotal motion and is applied against the stop 50. This fast withdrawal of the sliding unit 6 is finally followed by the opening of the energizing circuit of the electromagnet 70 by means of a micro-switch which is controlled by the slide-rest of the lathe when said slide-rest reaches the end of the return travel. The system of springs 7, 12 and the slide-valve 4 then revert to their initial equilibrium positions in which, when no external force is exerted on the arm 17, the sliding unit 6 of the duplicator is thrust towards the left by the fluid under pressure which acts on the piston 3. Said unit 6 then moves again automatically and freely towards the left whilst the lug 46 passes above the stop block 61 without coming into contact therewith and the roller 64 also passes over this latter (as shown in FIG. 5). In the meantime, when the sliding unit 6 has reached the end of travel, the drum 19 has performed a movement of rotation in the direction f under the action of the stud 24 on the wheel 22 in the manner described hereinabove in reference to the operation of the depth-of-cut brackets and the bracket 45 of the immediately adjacent groove has replaced the preceding bracket on the path of the lug 46. When said lug comes up against said bracket, and by reason of the fact that the brackets 45 are of greater height than the blocks 61, there accordingly takes place a pivotal motion of the bell-housing 47, the effort exerted for this purpose being smaller than that which would be necessary to upset the equilibrium of the slide-valve 4 as a result of the opposing action of the springs 7 and 12. There therefore does not take place any pivotal movement of the arm 17 or slowing-down of the movement of displacement of the sliding unit 6. Thereupon, and beyond the mid-point of pivotal motion of the bell-housing, the spring 53 cooperates in completing the pivotal motion, thereby bringing the bell-housing to bear on the stop 51 (as shown in FIG. 6). In this position, the arm 17 is abuttingly applied against this new bracket 45. The consequences are those previously mentioned when the function of the depth-of-cut brackets 45 was explained. The slide-rest of the lathe then moves again for a further machining cut.

Figure 4:
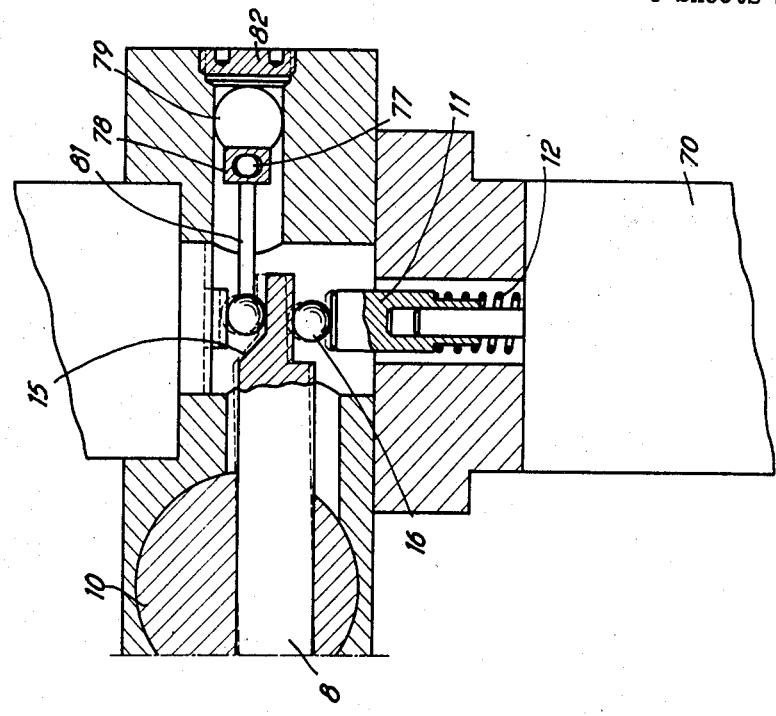
FIG. 4 is a part-sectional view along a plane which passes through the axis of the tailpiece of the feeler and the axis of the hydraulic distributor of the duplicator.
Figure 3:
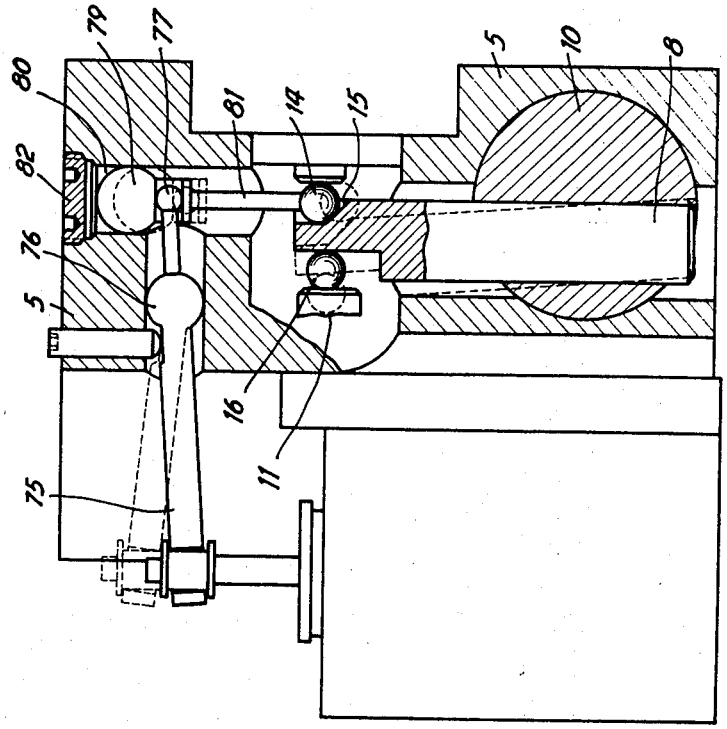
FIG. 3 is a view in elevation and partly in section taken along the line III—III of FIGS. 1 and 2.

Moreover, another electromagnet 72 having a vertical axis (as shown in FIG. 1) is secured to the end-wall 5; the energizing circuit of this electromagnet terminates in a micro-switch 73 which is attached to the sliding unit 6 of the duplicator and which can be encountered and closed by a lug 74. Said lug is fixed on the rotary drum in a position which is chosen so that, near the end of the movement of withdrawal of the sliding unit 6 and at the very moment when the penultimate movement of rotation of the drum 19 takes place under the action of the stud 24 on the wheel 22, said lug 74 moves into position so as to close said micro-switch 73 which accompanies the sliding unit 6 in the movements of displacement of this latter. The moving armature of the electromagnet 72 is pivotally coupled by means of a universal joint assembly to one end of a link-arm 75, as shown in FIGS. 3 and 4. Said link-arm is pivoted at 76 at an intermediate point of its length in the end-wall 5 so as to pivot about a horizontal axis whilst the other end of said link-arm is provided with a small knuckle 77 which is engaged in the transverse hole of a head 78 comprising a spherical portion 79 which is slidingly fitted inside a vertical guide bore 80 formed in the end-wall 5. Said head 78 is formed on a vertical rod 81, the lower end of which is joined to the ball 14 (shown in FIG. 2) which is interposed between the slide-valve 4 and the sloping shoulder 15 of the tailpiece of the feeler 9. A threaded plug 82 which is fitted in the end of the bore 80 and a ground pellet which is interposed between said plug and the ball 79 serve to adjust the position of this latter within the bore 80 and consequently the position of the ball 14 along the shoulder 15, thereby displacing the slide-valve 4 towards the left inasmuch as the strength of the spring 7 is lower than that of the spring 12. In respect of a same position of abutment of the arm 17, there is thus a new position of equilibrium of the slide-valve 4 and of the sliding unit 6 of the duplicator. This new position corresponds to a small pivotal movement of the arm 17 and to a corresponding displacement of the tool towards the part to be machined with respect to the position of the tool which, when no displacement of the ball 14 takes place, is defined by the stop bracket 45 with which the arm 17 is in contact. The same applies when the ball 14 is displaced through the intermediary of the link-arm 75 by means of the electromagnet 72 when this latter is energized via a holding-circuit relay and as a result of closure of the micro-switch 73 by the lug 74 of the rotary drum. Interruption of the energizing circuit of the electromagnet 72 at the requisite moment forms part of the general operation which will now be set forth.

The general operation of the mechanisms hereinabove described will be explained in connection with a machining operation performed on a workpiece as shown in FIG. 14 and starting from a cylindrical blank. As shown in this figure, this machining operation requires five cuts of equal depth and a sixth cut or so-called rough-finishing cut of smaller depth. There will accordingly be employed six stop brackets 45 and a corresponding number of reverse-motion stop blocks 61 which will be disposed in pairs in six consecutive grooves of the rotary drum 19, each pair consisting of a stop bracket 45 and a stop block 61. There will be chosen for this purpose the six first grooves which are located on the forward side of the stud 34 as considered in the direction of rotation f of the drum 19. The stop brackets 45 are spaced at distances equal to the constant depth of cut which is desired, with the exception of the sixth stop bracket which is disposed in exactly the same manner as the fifth. The stop bracket which is located farthest from the stud 34 is nearest the arm 17 and will therefore be employed for the first machining cut. To this end, the operation will consist in rotating the drum 19 in the direction f so as to bring said first stop bracket on the path of the lug 46. Each reverse-motion stop block 61 is adjusted by spacing this latter with respect to the stop bracket 45 located in the same groove 63 in such a manner as to ensure that the closure of the micro-switch 66 by the roller 64 takes place at the desired point of the workpiece. These points are shown in FIG. 14 in the case of the different cuts by the vertical arrows to which is assigned an index corresponding to the cut.

Inasmuch as the depth of the cuts with the exception of the sixth is constant, the stop blocks 61 are spaced in relation to the stop brackets 45 at a distance which corresponds to said depth of cut but which is reduced to a very small extent in order to gain the maximum time during the machining operation while ensuring that the tool is fully disengaged in its movement of transverse withdrawal on completion of the second cut, for example, and prior to initiation of the longitudinal withdrawal of said tool.

When the arm 17 has been brought up against the stop bracket 45 of the first cut by applying the lug 46 of the bell-housing 47 against said stop bracket 45, the tool is brought into contact with the workpiece by displacement of the cross-slide, whereupon said tool is advanced by means of said cross-slide over a distance corresponding to the depth of cut. When the lathe is started up, the cut is performed in the usual manner by displacing the slide-rest. It should nevertheless be noted that, during this cut, the feeler is not in contact with the template or part to be duplicated. It is only on completion of the cut and at the extremity of the workpiece that the feeler comes up against a stop (not shown in the drawings). The lug 46 moves away from the stop bracket 45 as shown in FIGS. 7 and 8 and withdraws, the roller 64 runs onto the reverse-motion stop block 61, closes the micro-switch 66, thereby energizing the electromagnet 70 so as to produce the rapid withdrawal of the sliding unit 6 of the duplicator. This movement of withdrawal is carried out in the manner explained hereinabove at the same time as the reverse motion of the slide-rest by means which are commonly employed in lathes. Towards the end of the cross-traverse reverse motion of the tool, the stud 24 comes into contact with the wheel 22 and, as has been explained earlier, initiates the rotation of the drum 19, thereby bringing the following stop bracket 45 on the path of the lug 46. The return of the sliding unit 6 of the duplicator in the forward direction, that is to say the forward motion of the tool, is carried by interrupting the supply of current to the electromagnet 70 (by opening the holding circuit of the control contactor of said electromagnet) but only when the slide-rest of the lathe has practically returned to its initial position. The supply of current is interrupted by means of a micro-switch actuated by said slide-rest shortly before coming into contact with the stop which initiates its reverse motion. A further cut, namely the cut 2, then takes place automatically and the procedure which has just been set forth is repeated. However, during this new cut, the feeler comes into contact with that portion of the part which is located between the arrows 1 and 3 (as shown in FIG. 14) and accordingly reproduces the shape of said portion in the usual manner. During the following cut, namely the third, which is also initiated automatically, the feeler carries out the reproduction of the conical portion of the part which is located between the arrows 3 and 4. From point 4 to point 3, the feeler has consequently caused the reverse motion of the sliding unit of the duplicator and therefore produced the withdrawal of the lug 46 of the pivotal bell-housing 47 to a distance equal to the spacing between the stop members 61 and 45 which corresponds to the cut under consideration. The micro-switch 66 is therefore actuated and delivers the signal which produces the rapid withdrawal of the sliding unit of the duplicator and the reverse motion of the slide-rest. The cuts 4 and 5 then take place in a similar manner. On completion of the fifth cut, the successive movements of rotation of the drum 19 have brought the lug 74 into a position such that, at the time of rotation of the drum on completion of the fifth cut, said lug comes into contact with and closes the micro-switch 73, thus initiating the operation of the electromagnet 72 which, as has been explained earlier, causes the relative displacement to the desired depth for the finishing cut between the sliding unit 6 and the fixed unit of the duplicator, therefore between the tool and the position of equilibrium of the arm 17 against the stop bracket 45 which takes the place of the preceding bracket but exactly at the same point.

The finishing cut then takes place in the same manner as all the other cuts. However, on completion of this cut, and since no stop block 61 is present for producing the withdrawal of the duplicator and of the slide-rest, the said slide-rest moves to a short distance beyond the workpiece and comes into contact with a micro-switch (not illustrated) which stops the main motor of the lathe, supplies current to the electromagnet 70 for initiating the rapid withdrawal of the sliding unit 6 of the duplicator, also energizes the electromagnet which causes the reverse motion of the slide-rest and interrupts the holding circuit of the contactor of the finishing-cut electromagnet 72. The movement of rotation of the drum which is produced by the withdrawal of the slide unit 6 of the duplicator causes the stud 34 in this case to come into contact with the tailpiece 35 of the rocker-arm 31 and therefore causes the pivotal motion of this latter. The rotary drum 19 is thus released and moves back by means of its restoring spring into the rest position which is determined by the abutting contact of the stud 34 with the opposite face of the tailpiece 35 of the rocker-arm 31.

It is apparent from the foregoing that the system of reverse-motion stop blocks in accordance with the invention makes it possible to dispense with multiple longitudinal stops which would otherwise be necessary to initiate at the appropriate locations the reverse movements of the slide-rest which are now controlled by the stop blocks according to the invention.

What I claim is:

1. A hydraulic duplicating mechanism for use in machine-tools and in particular in slide lathes for the purpose of displacing the tool transversely to the direction of the displacement along the workpiece as a result of the action produced on the hydraulic distributor of the duplicating mechanism by a feeler which forms part of the said duplicating mechanism and which is adapted to cooperate with a template or part to be duplicated, the duplicating mechanism comprising for determining the position of equilibrium of the distributor under the action of the feeler a retaining device which is independent of the template or of the part to be duplicated and which is placed so as to serve as a stop for the feeler, said retaining device being secured to the fixed unit of the duplicator and stationarily mounted in relation thereto while comprising a retaining member which is positionally variable with respect to the said fixed unit and which can thus be brought on the path of the feeler under the action of a mechanism for changing the position of the said retaining member and into successive positions located in spaced relation along the path of a member which is positionally related to the feeler, the successive positions aforesaid being preferably variable along said path.

2. A mechanism in accordance with claim 1, wherein said mechanism for changing the position of the retaining member is interposed between said member and the sliding unit of the duplicator, thereby automatically changing the position of the said retaining member as a function of the sliding motion of the said sliding unit of the duplicator and in principle at the end of the movement of withdrawal of the said sliding unit.

3. A mechanism in accordance with claim 1, wherein different points of the retaining member serve as successive stops for the feeler and are constituted by movable stop brackets which can be adjusted at will on the said retaining member.

4. A mechanism in accordance with claim 3, wherein said retaining member is a rotary drum, guides being formed at the periphery of said drum and parallel to the axis thereof, said axis being parallel to the direction of sliding motion of the movable unit of the duplicator.

5. A mechanism in accordance with claim 1, wherein said retaining member is subjected to an elastic restoring force and selectively immobilized in different positions by means of a positioning device which provides automatic disengagement as a result of the change of position of the said retaining member at the end of travel of the said member.

6. A hydraulic duplicating mechanism for use in machine-tools such as slide lathes for the purpose of displacing the tool transversely to the direction of its displacement along the workpiece as a result of the action produced on the hydraulic distributor of the duplicating mechanism by a feeler which forms part of the said duplicating mechanism and which is adapted to cooperate with a template or part to be duplicated, wherein in addition to the control of the duplicator distributor by the feeler itself, the duplicator comprises an auxiliary device for displacing the distributor in the direction which produces the withdrawal of the sliding unit of the duplicator and therefore the cross-transverse reverse motion of the tool and said auxiliary device comprises a control member carried by the sliding unit of the duplicator and adapted to accompany the said unit in its motion but capable of changing position with respect to the sliding unit under the action of a retaining device which is secured to the fixed unit of the duplicator and stationarily mounted in relation thereto while comprising a retaining member which is positionally variable with respect to the said fixed unit so as to permit of its being brought selectively on the path of the said control member under the action of a mechanism for changing the position of the said retaining member and into positions which are spaced along the said path and preferably variable separately along the said path, the said position-changing mechanism being interposed between the said retaining member and the sliding unit of the duplicator, thereby automatically changing the position of the said retaining member as a function of the motion of the said sliding unit of the duplicator and in principle on completion of the movement of withdrawal of the said unit, the change of position of the said control member when the said member comes up against the retaining device being utilised for the purpose of displacing the distributor.

7. A mechanism as in claim 6, wherein said change of position of the said control member when the said member comes up against the retaining device is utilised for the purpose of displacing the distributor by initiating the closure of a contact inserted in the energising circuit of an electromagnet for producing the displacement of the said distributor, reopening of the said contact being carried out by means of a pivotal lug which takes part in the displacement of the sliding unit and is adapted to produce action on the switch as a result of the pivotal motion thereof as and when the said lug subsequently comes into contact with the said retaining device.

8. A mechanism in accordance with claim 7, wherein said switch also initiates as a result of its closure the action of the machine-tool mechanism which produces the reverse motion of the tool along the workpiece.

9. A mechanism in accordance with claim 6, wherein the position-changing retaining member is the same and is fitted with two sets of stop blocks which are positionally adjustable with respect to the said retaining member and separately in the case of each stop block.

10. A mechanism in accordance with claim 7, wherein the lug which serves to open the switch is adapted to cooperate with the same stop block as the lug which serves to effect the closure of the said switch.

11. A mechanism in accordance with claim 7, wherein said lug which serves to open the switch also constitutes the member which is adapted to cooperate with the cut-control stop brackets and is positionally associated with the feeler for that purpose.

12. A mechanism in accordance with claim 7, wherein said switch is fixed within a pivotal bell-housing which is supported within a cage so as to be capable of swinging about an axis between two end bearing positions and which is acted upon by a spring disposed in such a manner that its line of action moves from one side of the said axis to the other during the pivotal motion of the said bell-housing, the said cage being connected to the sliding unit of the duplicator for common movement therewith and the bell-housing being intended to constitute said control member, the switch being actuated by a spring-loaded rocker-arm whose extremity is located in a position such that it comes into abutting contact with that point of the said retaining member which is located on the path of the said rocker-arm extremity which accompanies the movement of withdrawal of the sliding unit of the duplicator and which thus produces the closure of the said switch in opposition to the said spring by coming into contact with the said abutment point, the said bell-housing being additionally provided with an appendage which is located behind the said rocker-arm extremity as considered in the direction of withdrawal of the sliding unit of the duplicator so as to come into contact after the said rocker-arm extremity with the same abutment point of the retaining member and as a result of the said abutting contact to cause the bell-housing to pass beyond the position of unstable equilibrium thereof and thus to enable the spring to complete the pivotal motion of the said bell-housing towards the other bearing position thereof and also to enable the said spring-loaded rocker-arm to return to the switch-opening position thereof.

13. A mechanism in accordance with claim 12, wherein said cage is attached to an arm which is pivotally mounted on the sliding unit of the duplicator and the extremity of which is interposed between the tailpiece of the feeler and a spring which exerts on the distributor by means of the said interposed extremity a thrust which is applied in that direction of displacement of the distributor which produces the withdrawal of the sliding unit of the duplicator, the system consisting of cage and bell-housing being provided for that purpose with a lug which is preferably the said bell-housing appendage and which is capable of coming into abutting contact with the retaining member, the said abutting contact being such as to determine the position of equilibrium of the feeler.

14. A mechanism in accordance with claim 4, wherein said mechanism for changing the position of the retaining member comprises a wheel which is fixed coaxially with the rotary drum and provided at the periphery thereof with helical grooves in which a stud is capable of penetrating, the said stud being secured to the sliding unit of the duplicator and having a diameter which is substantially smaller than the width of each groove.

15. A mechanism in accordance with claim 4, wherein said mechanism for changing the position of the retaining member comprises a device for positioning the said member and that the said device is provided with longitudinal grooves having V-shaped cross-section which are formed in the rotary drum and in which is engaged a ball carried by a pivotal arm which is urged by a spring towards the said rotary drum.

16. A mechanism in accordance with claim 15, wherein said pivotal arm is coupled by means of an articulation with a rocker-arm located on the path of a stud which is rigidly fixed on the rotary drum and rotates therewith so as to be encountered by the said stud at the end of the movement of rotation of the drum and thrust by the said stud in order to cause the pivotal movement of the said arm in opposition to the said spring, the said rocker-arm being additionally provided with a lug which is brought as a result of the pivotal movement of the said rocker-arm on the path of a lock-catch which is secured to the sliding unit of the duplicator and in which the said lug is thus engageable on completion of the movement of withdrawal of the said sliding unit.

17. A mechanism in accordance with claim 5, wherein said restoring force of the rotary drum is provided by two springs which work by twisting in opposition to each other and disposed coaxially with the rotary drum one inside the other at the end of the said drum, the ends of one of the said springs being secured respectively to a freely rotatable disc and to the drum and the ends of the other spring being secured to the said disc and to a fixed point which is integral with the fixed unit of the duplicator.

18. A mechanism in accordance with claim 5, wherein a ball interposed between the distributor and a shoulder of a lever which is made fast for rotation with the feeler is displaceable on the said shoulder by means of a drive mechanism for the purpose of actuating the slide-valve of the distributor without any pivotal motion of the feeler, the said drive mechanism being connected to the retaining member in such a manner as to be actuated automatically at the end of the position-changing motion of the said retaining member.

References Cited

UNITED STATES PATENTS 2,913,945  11/1959  Granberg et al. _____ 82—14

GERALD A. DOST, Primary Examiner

U.S. Cl. X.R.

90—62